(12) United States Patent
Shi et al.

(10) Patent No.: US 10,911,940 B2
(45) Date of Patent: *Feb. 2, 2021

(54) LOCATION CHANGE REPORTING METHOD, DEVICE, AND SYSTEM

(71) Applicant: HUAWEI TECHNOLOGIES CO., LTD., Guangdong (CN)

(72) Inventors: Shufeng Shi, Xi'an (CN); Hui Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,998

(22) Filed: Nov. 6, 2019

(65) Prior Publication Data
US 2020/0077255 A1 Mar. 5, 2020

Related U.S. Application Data

(63) Continuation of application No. 16/394,271, filed on Apr. 25, 2019, now Pat. No. 10,499,240, which is a
(Continued)

(30) Foreign Application Priority Data

Oct. 31, 2016 (CN) .......................... 2016 1 0934258

(51) Int. Cl.
*H04L 12/14* (2006.01)
*H04W 8/20* (2009.01)
(Continued)

(52) U.S. Cl.
CPC ............... *H04W 8/20* (2013.01); *H04L 12/14* (2013.01); *H04L 12/1407* (2013.01);
(Continued)

(58) Field of Classification Search
CPC .... H04L 12/14; H04L 12/1407; H04M 15/00; H04M 15/64; H04M 15/66;
(Continued)

(56) References Cited

U.S. PATENT DOCUMENTS

| 10,285,155 B1 * | 5/2019 | Dodd-Noble ....... H04W 64/003 |
| 2012/0307685 A1 * | 12/2012 | Kim ...................... H04W 48/16 370/255 |

(Continued)

FOREIGN PATENT DOCUMENTS

| CN | 101730041 A | 6/2010 |
| CN | 105163345 A | 12/2015 |

(Continued)

OTHER PUBLICATIONS

S2-164231 Ericsson et al.,"Reporting entering or leaving a set of PRAs",3GPP TSG-SA2 Meeting #116,Jul. 11-15, 2016 Vienna, Austria,total 4 pages.
(Continued)

*Primary Examiner* — Nathan S Taylor (57) ABSTRACT

In a location change reporting method, a session management function entity receives from a mobility management entity information including location change information of UE in a first presence reporting area (PRA), an identity of the first PRA, and an identity of a PRA set that includes the first PRA. The session management function entity identifies, based on the identity of the PRA set and locally stored PRA subscription information, a subscription entity that subscribes to location change events of the UE in the PRA set, and sends the identity of the first PRA and the location change information of the UE in the first PRA to the subscription entity.

12 Claims, 3 Drawing Sheets

Related U.S. Application Data continuation of application No. PCT/CN2017/102963, filed on Sep. 22, 2017.

(51) Int. Cl.
*H04W 4/24* (2018.01)
*H04W 8/08* (2009.01)
*H04W 64/00* (2009.01)
*H04M 15/00* (2006.01)

(52) U.S. Cl.
CPC ........... *H04M 15/00* (2013.01); *H04M 15/64* (2013.01); *H04M 15/66* (2013.01); *H04M 15/8033* (2013.01); *H04M 15/8038* (2013.01); *H04W 4/24* (2013.01); *H04W 8/08* (2013.01); *H04W 64/00* (2013.01)

(58) Field of Classification Search
CPC ......... H04M 15/8033; H04M 15/8038; H04W 4/24; H04W 8/08; H04W 8/20
See application file for complete search history.

(56) References Cited

U.S. PATENT DOCUMENTS

| | | | |
|---|---|---|---|
| 2015/0005004 A1 | 1/2015 | Cuervo et al. | |
| 2015/0365789 A1* | 12/2015 | Salot | H04W 4/021 455/456.1 |
| 2017/0238165 A1 | 8/2017 | Gotoh et al. | |
| 2017/0302751 A1* | 10/2017 | Yang | H04W 4/029 |
| 2017/0373863 A1* | 12/2017 | Mouafik | H04L 12/1407 |
| 2018/0255474 A1* | 9/2018 | Toth | H04W 8/04 |
| 2018/0376302 A1* | 12/2018 | Pancorbo Marcos | H04L 12/14 |
| 2019/0172092 A1* | 6/2019 | Mouquet | H04M 15/66 |
| 2019/0222998 A1* | 7/2019 | Kim | H04W 8/08 |

FOREIGN PATENT DOCUMENTS

| | | |
|---|---|---|
| CN | 105657650 A | 6/2016 |
| CN | 105827569 A | 8/2016 |
| EP | 2613597 A1 | 7/2013 |
| EP | 3007474 A1 | 4/2016 |
| JP | 2016139842 A | 8/2016 |
| KR | 20140111001 A | 9/2014 |
| WO | 2015038438 A1 | 3/2015 |
| WO | 2016074700 A1 | 5/2016 |
| WO | 2017078789 A1 | 5/2017 |

OTHER PUBLICATIONS

S2-166323 Bruno Landais,"LS on Grouping of Presence Reporting Areas into a PRA set",SA WG2 Meeting #S2-118,Nov. 14-18, 2016, Reno, Nevada, USA,total 2 pages.

C4-165265 C4-165xyz Bruno Landais,"LS on Grouping of Presence Reporting Areas into a PRA set",3GPP TSG CT4 Meeting #75,Guilin, The People"s Republic of China; Oct. 17-21, 2016,total 2 pages.

3GPP TS 23.060 V14.1.0 (Sep. 2016),3rd Generation Partnership Project;Technical Specification Group Services and System Aspects;General Packet Radio Service (GPRS);Service description;Stage 2(Release 14),total 366 pages.

3GPP TS 23.203 V14.1.0 (Sep. 2016),3rd Generation Partnership Project;Technical Specification Group Services and System Aspects;Policy and charging control architecture(Release 14),total 253 pages.

3GPP TS 23.401 V14.1.0 (Sep. 2016),3rd Generation Partnership Project;Technical Specification Group Services and System Aspects;General Packet Radio Service (GPRS) enhancements for Evolved Universal Terrestrial Radio Access Network (E-UTRAN) access(Release 14),total 379 pages.

XP051295180 3GPP TR 23.710 V14.0.0 (Jun. 2016),3rd Generation Partnership Project;Technical Specification Group Services and System Aspects;Study on Improvement of awareness of user location change (Release 14),total 26 pages.

* cited by examiner

LOCATION CHANGE REPORTING METHOD, DEVICE, AND SYSTEM

CROSS-REFERENCE TO RELATED APPLICATIONS

This application is continuation of U.S. patent application Ser. No. 16/394,271, filed Apr. 25, 2019, which is a continuation of International Application PCT/CN2017/102963, field on Sep. 22, 2017, which claims priority to Chinese Patent Application No. 201610934258.8, filed on Oct. 31, 2016. All the afore-mentioned patent applications are hereby incorporated by reference in their entirety.

TECHNICAL FIELD

The present application relates to the field of communications technologies, and in particular to a location change reporting method, device, and system.

BACKGROUND

As communication services are diversified, an operator may have a specific charging or control policy for a specific area. Currently, the policy is implemented by presence reporting area (PRA) characteristics in the 3rd Generation Partnership Project (3GPP) standard.

Specifically, when a policy and charging rules function (PCRF) or an online charging system (OCS) needs to sense a location change status of user equipment (UE) in a PRA such as a status of entering or leaving the PRA by the UE, the PCRF or the OCS subscribes with a packet data network (PDN) gateway (PGW) to a location change event of the UE in the PRA. When subscribing to the location change event of the UE in the PRA, the PCRF or the OCS delivers, for a multi-PRA scenario, an identity (ID) of a PRA set (set) of all PRAs to the PGW. When receiving subscription information carrying the ID of the PRA set, the PGW continues to deliver the ID of the PRA set to a mobility management entity (MME) or a serving general packet radio service (GPRS) support node (SGSN), to instruct the MME or the SGSN to monitor a location change status of the UE in the PRA and report a location change event of the UE in the PRA to the PCRF or the OCS when a location of the UE in the PRA changes. The PCRF or the OCS performs a new policy or charging adjustment based on the location change event in the PRA.

However, in the prior art, when the MME or the SGSN reports the location change event of the UE in the PRA, only an ID(s) of the PRA is carried, and a correspondence between the ID of the PRA set and the ID of the PRA is not configured in the PGW. Consequently, the MME or the SGSN cannot decide how to report the location change event in the PRA to the PCRF or the OCS.

SUMMARY

Embodiments of the present application provide a location change reporting method, device, and system, to resolve at least an existing problem that a session management function entity cannot decide how to report a location change event of UE in a PRA to a subscription entity because the location change event of the UE in the PRA that is reported by a mobility management entity carries only an ID(s) of the PRA when an ID of the PRA set is used to subscribe to the location change event of the UE in the PRA in a multi-PRA scenario.

To achieve the foregoing objective, the embodiments of the present application provide the following technical solutions:

According to a first aspect, a location change reporting method is provided, including: receiving, by a session management function entity, location change information of UE in a PRA, an identity of the PRA, and an identity of a PRA set to which the PRA corresponding to the identity of the PRA belongs that are sent by a mobility management entity, where the location change information of the UE in the PRA includes information about entering or leaving the PRA by the UE; determining, by the session management function entity based on the identity of the PRA set and stored PRA subscription information, a subscription entity that subscribes to a location change event of the UE in any PRA in the PRA set, where the PRA subscription information includes the identity of the PRA set and an identity of the subscription entity that subscribes to the location change event of the UE in any PRA in the PRA set; and sending, by the session management function entity, the identity of the PRA and the location change information of the UE in the PRA to the subscription entity. In other words, in this embodiment of the present application, the mobility management entity sends, to the session management function entity, the location change information in the PRA, the identity of the PRA, and the identity of the PRA set to which the PRA corresponding to the identity of the PRA belongs, so that the session management function entity can determine, based on the identity of the PRA set, the subscription entity that subscribes to the location change event of the UE in any PRA in the PRA set, and further can send the identity of the PRA and the location change information of the UE in the PRA to the subscription entity. This can resolve an existing problem that a session management function entity cannot decide how to report a location change event of UE in a PRA to a subscription entity because the location change event of the UE in the PRA that is reported by a mobility management entity carries only an ID(s) of the PRA when an ID of the PRA set is used to subscribe to the location change event of the UE in the PRA in a multi-PRA scenario.

In a possible design, the method further includes: receiving, by the session management function entity, a PRA subscription request sent by the subscription entity, where the PRA subscription request carries the identity of the PRA set and is used to request to subscribe to a location change event of the UE in any PRA in the PRA set corresponding to the identity of the PRA set; determining, by the session management function entity, the PRA subscription information based on the PRA subscription request and storing the PRA subscription information; and sending, by the session management function entity, a PRA location change notification request to the mobility management entity, where the PRA location change notification request carries the identity of the PRA set and is used to instruct the mobility management entity to perform PRA location change reporting when the UE enters or leaves any PRA in the PRA set corresponding to the identity of the PRA set. In other words, in this embodiment of the present application, the session management function entity may determine, based on the received PRA subscription request sent by the subscription entity, the PRA subscription information corresponding to the subscription entity and store the PRA subscription information, so that after subsequently receiving the identity of the PRA and the identity of the PRA set to which the PRA corresponding to the identity of the PRA belongs that are sent by the mobility management entity, the session management function entity can determine, based on the subscription information, the subscription entity that subscribes to the location change event of the UE in any PRA in the PRA set.

In a possible design, the subscription entity includes a PCRF entity or an OCS entity.

In a possible design, the mobility management entity includes an MME, an SGSN, or an MMF.

In a possible design, the session management function entity includes a PGW or an SMF.

According to a second aspect, an embodiment of the present application provides a session management function entity, and the session management function entity has a function of implementing behavior of the session management function entity in the foregoing method embodiment. The function may be implemented by hardware or may be implemented by executing corresponding software by hardware. The hardware or the software includes one or more modules corresponding to the function.

According to a third aspect, an embodiment of the present application provides a session management function entity, including a processor, a memory, a bus, and a communications interface, where the memory is configured to store a computer execution instruction; the processor is connected to the memory by using the bus; and when the session management function entity runs, the processor executes the computer execution instruction stored in the memory, so that the session management function entity performs the location change reporting method according to any design of the first aspect.

According to a fourth aspect, an embodiment of the present application provides a computer storage medium, configured to store a computer software instruction used by the foregoing session management function entity, where the computer software instruction includes a program designed for the session management function entity to execute the foregoing aspects.

In addition, for a technical effect brought by any design manner of the second aspect to the fourth aspect, refer to the technical effects brought by the different design manners of the first aspect. Details are not described herein again.

According to a fifth aspect, an embodiment of the present application provides a location change system, including a mobility management entity and the session management function entity according to any of the foregoing aspects.

These or other aspects of the present application are more concise and comprehensible in descriptions of the following embodiments.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following descriptions show merely some embodiments of the present application, and a person of ordinary skill in the art may still derive other drawings from these accompanying drawings without creative efforts.

DESCRIPTION OF EMBODIMENTS

The following describes the technical solutions in the embodiments of the present application with reference to the accompanying drawings in the embodiments of the present application. Apparently, the described embodiments are merely some rather than all of the embodiments of the present application.

In addition, in the descriptions of the present application, unless otherwise specified, "a plurality of" means two or more.

Figure 1:
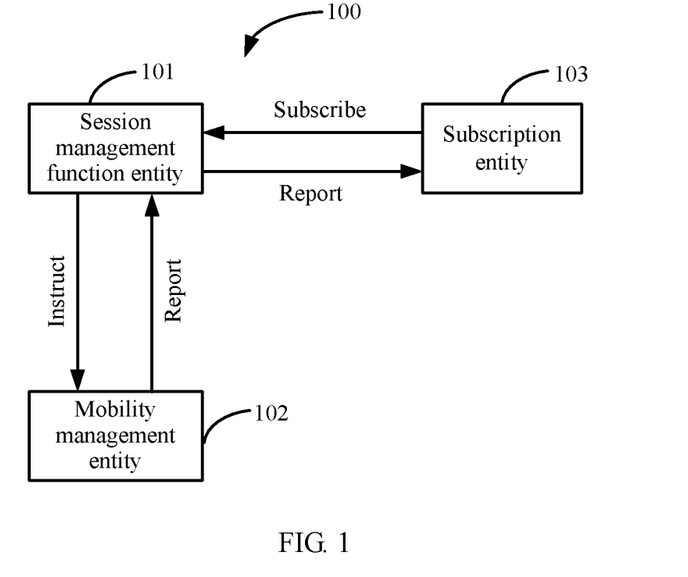
FIG. 1 is a network architectural diagram of a location change system 100 according to an embodiment of the present application.

FIG. 1 is a network architectural diagram of a location change system 100 according to an embodiment of the present application. The location change system 100 includes a session management function entity 101, a mobility management entity 102, and a subscription entity 103. The subscription entity 103 is configured to subscribe with the mobility management entity 102 to a location change event of UE in a PRA. The session management function entity 101 is configured to instruct the mobility management entity 102 to perform PRA monitoring and PRA location change reporting and decide how to report to the subscription entity 103 after receiving location change information that indicates that the UE enters or leaves the PRA and that is sent by the mobility management entity 102. The mobility management entity 102 is configured to perform PRA monitoring and PRA location change reporting.

Specifically, the location change system 100 may be applied to an existing 2nd Generation (2G) network, 3rd Generation (English: 3rd-Generation, 3G for short) network, or 4th Generation (4G) network, or may be applied to a future 5th Generation (5G) network or another future network. This is not specifically limited in this embodiment of the present application.

A typical 2G network includes a Global System for Mobile Communications (GSM) network or a general packet radio service (GPRS) network. A typical 3G network includes a Universal Mobile Telecommunications System (UMTS) network. A typical 4G network includes a Long Term Evolution (LTE) network.

It can be understood that in different networks, network elements or entities corresponding to the session management function entity 101, the mobility management entity 102, and the subscription entity 103 may have different names. An example is as follows:

If the location communications system 100 is applied to the 2G network or the 3G network, a network element or an entity corresponding to the session management function entity 101 may be a PGW, a network element or an entity corresponding to the mobility management entity 102 may be an SGSN, and a network element or an entity corresponding to the subscription entity 103 may be a PCRF or an OCS.

If the location communications system 100 is applied to the 4G network, a network element or an entity corresponding to the session management function entity 101 may be a PGW, a network element or an entity corresponding to the mobility management entity 102 may be an MME, and a network element or an entity corresponding to the subscription entity 103 may be a PCRF or an OCS.

If the location communications system 100 is applied to the future 5G network, a network element or an entity corresponding to the session management function entity 101 may be a session management function (SMF) entity, a network element or an entity corresponding to the mobility management entity 102 may be a mobility management function (MMF) entity, and a network element or an entity corresponding to the subscription entity 103 may be a policy function (policy function) entity or an OCS.

However, the name is not intended to limit the entity. In the future 5G network and the another future network, the network elements or the entities corresponding to the session management function entity 101, the mobility management entity 102, and the subscription entity 103 may alternatively have other names. This is not specifically limited in this embodiment of the present application.

It can be understood that the network element or the entity corresponding to the session management function entity 101 may have another function in addition to a session management function; the network element or the entity corresponding to the mobility management entity 102 may have another function in addition to a mobility management function; and the network element or the entity corresponding to the subscription entity 103 may have another function in addition to a subscription function. This is not specifically limited in this embodiment of the present application.

It can be understood that the network elements or the entities corresponding to the session management function entity 101, the mobility management entity 102, and the subscription entity 103 may be implemented by one entity device or may be implemented jointly by a plurality of entity devices. This is not specifically limited in this embodiment of the present application.

Figure 2:
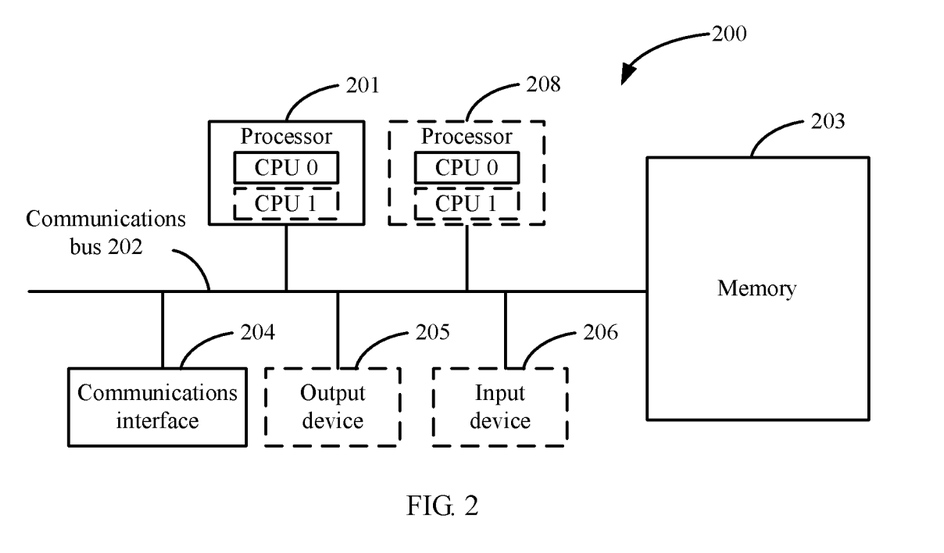
FIG. 2 is a schematic diagram of a computer device according to an embodiment of the present application.

For example, as shown in FIG. 2, the session management function entity 101 in FIG. 1 may be implemented by a computer device (or a system) in FIG. 2.

FIG. 2 is a schematic diagram of a computer device according to an embodiment of the present application. The computer device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits for controlling execution of a program in the solutions of the present application.

The communications bus 202 may include a path for transferring information between the foregoing components.

The communications interface 204 is configured to communicate, by using any apparatus such as a transceiver, with another device or a communications network such as Ethernet, a radio access network (RAN), or a wireless local area network (WLAN).

The memory 203 may be but is not limited to a read-only memory (read-only memory, ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. The memory may exist independently, and is connected to the processor by using the bus. The memory may alternatively be integrated with the processor.

The memory 203 is configured to store application program code for executing the solutions of the present application, and the processor 201 controls the execution. The processor 201 is configured to execute the application program code stored in the memory 203, to implement location change reporting.

During specific implementation, in an embodiment, the processor 201 may include one or more CPUs, for example, a CPU 0 and a CPU 1 in FIG. 2.

During specific implementation, in an embodiment, the computer device 200 may include a plurality of processors, for example, the processor 201 and a processor 208 in FIG. 2. Each of these processors may be a single-core (single-CPU) processor, or may be a multi-core (multi-CPU) processor. The processor herein may refer to one or more devices, circuits, and/or processing cores for processing data (for example, a computer program instruction).

During specific implementation, in an embodiment, the computer device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector (projector). The input device 206 communicates with the processor 201, and may receive a user input in a plurality of manners. For example, the input device 206 may be a mouse, a keyboard, a touchscreen device, or a sensor device.

The computer device 200 may be a general-purpose computer device or a dedicated computer device. During specific implementation, the computer device 200 may be a desktop computer, a portable computer, a network server, a personal digital assistant (PDA), a mobile phone, a tablet computer, a wireless terminal device, a communications device, an embedded device, or a device with a structure similar to that in FIG. 2. A type of the computer device 200 is not limited in this embodiment of the present application.

Figure 3:
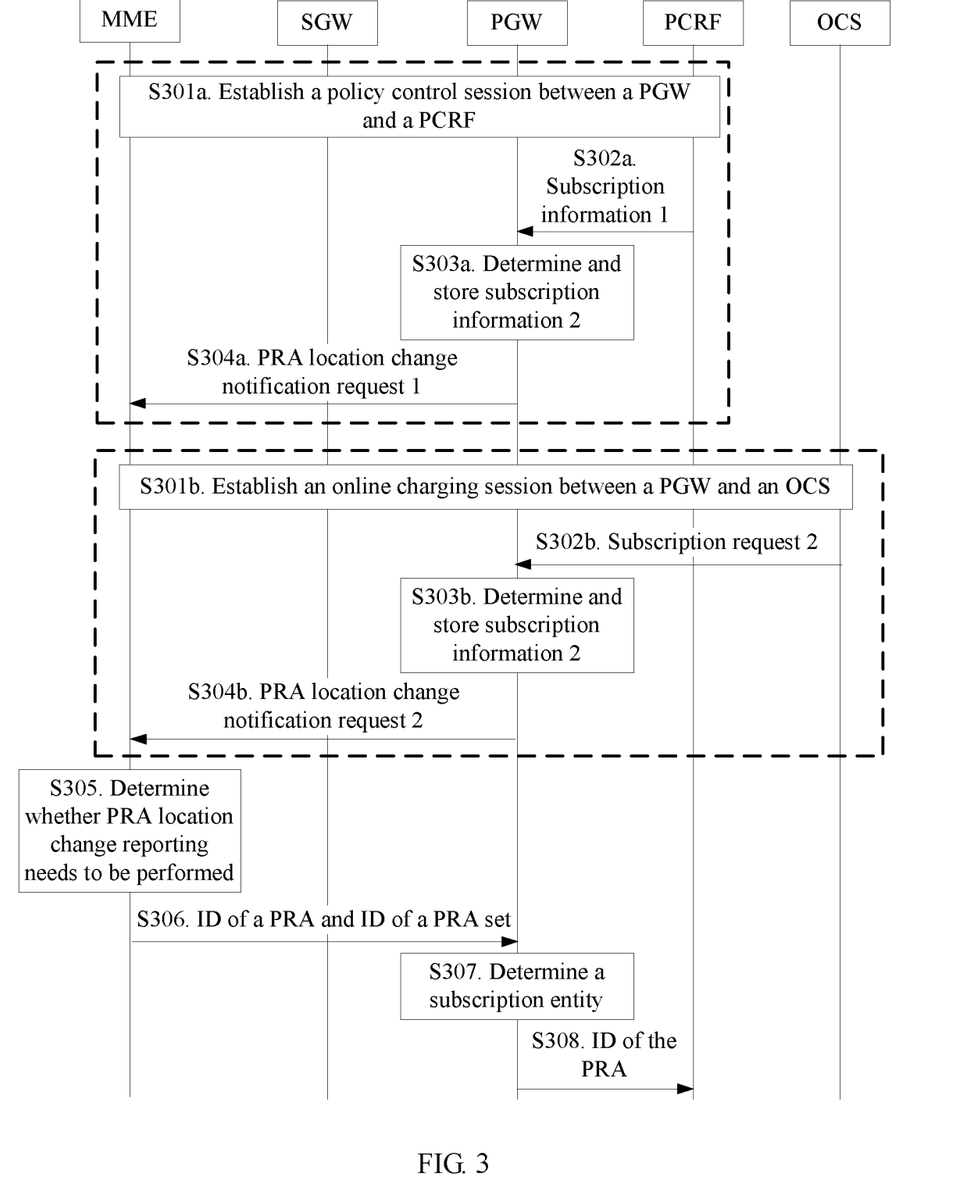
FIG. 3 is a schematic flowchart of a location change method according to an embodiment of the present application.

FIG. 3 is a schematic flowchart of a location change reporting method according to an embodiment of the present application. The method is described by using an example in which the location communications system 100 shown in FIG. 1 is applied to an existing 4G network, and relates to interaction between a PCRF, a PGW, a serving gateway (SGW), and an MME and interaction between an OCS, a PGW, an SGW, and an MME. The method includes steps S301 to S308. Steps S301a to S304a are a process in which the PCRF subscribes with the PGW to a location change event and delivers a PRA location change notification request. Steps S301b to S304b are a process in which the OCS subscribes with the PGW to a location change event and delivers a PRA location change notification request. Steps S305 to S308 are a PRA location change decision and reporting process.

Steps S301a to S304a are specifically as follows:

S301a. Establish a policy control session between a PGW and a PCRF.

A process of establishing the policy control session between the PGW and the PCRF may be as follows:

The MME sends a create session request (create session request) to the PGW by using the SGW, to trigger establishment of the policy control session between the PGW and the PCRF. After the session is established, the PGW sends a create session response (create session response) to the MME by using the SGW. The process belongs to an existing procedure, and therefore details are not described herein in this embodiment of the present application.

S302a. The PCRF sends a PRA subscription request 1 to the PGW, so that the PGW receives the PRA subscription request 1, where the PRA subscription request 1 carries an identity of a PRA set 1 and is used to request to subscribe to a location change event of UE in any PRA in the PRA set 1.

It should be noted that in this embodiment of the present application, subscribing to a location change event of UE in a PRA is specifically subscribing to a location change event of entering or leaving the PRA by the UE. This explanation is provided herein and is applicable to all the following embodiments. Details are not described again below.

It should be noted that a PRA subscription request sent by the PCRF to the PGW is marked as the PRA subscription request 1 herein, so that the PRA subscription request is distinguished from a PRA subscription request sent by the OCS to the PGW below. This explanation is provided herein and is applicable to all the following embodiments. Details are not described again below.

It should be noted that a PRA set in the PCRF is marked as the PRA set 1 herein, so that the PRA set is distinguished from a PRA set in the OCS below. This explanation is provided herein and is applicable to all the following embodiments. Details are not described again below.

S303a. The PGW determines PRA subscription information 1 based on the PRA subscription request 1 and stores the PRA subscription information 1, where the PRA subscription information 1 includes the identity of the PRA set 1 and an identity of the PCRF.

The PCRF is a subscription entity that subscribes to the location change event of the UE in any PRA in the PRA set 1.

It should be noted that subscription information corresponding to the PCRF is marked as the PRA subscription information 1 herein, so that the subscription information is distinguished from subscription information corresponding to the OCS below. This explanation is provided herein and is applicable to all the following embodiments. Details are not described again below.

S304a. The PGW sends a PRA location change notification request 1 to the MME by using the SGW, so that the MME receives the PRA location change notification request 1, where the PRA location change notification request 1 carries the identity of the PRA set 1 and is used to instruct the MME to perform PRA location change reporting when the UE enters or leaves any PRA in the PRA set 1 corresponding to the identity of the PRA set 1.

In other words, a function of the PRA location change notification request 1 is to instruct the MME to report location change information of the UE in the PRA when a location of the UE relative to any PRA in the PRA set 1 changes.

It should be noted that a PRA location change notification request that is sent by the PGW to the MME after the PCRF sends the PRA subscription request 1 to the PGW is marked as the PRA location change notification request 1 herein, so that the PRA location change notification request is distinguished from a PRA location change notification request that is sent by the PGW to the MME after the OCS sends a PRA subscription request 2 to the PGW below. This explanation is provided herein and is applicable to all the following embodiments. Details are not described again below.

A manner in which the PGW sends the PRA location change notification request to the MME is not specifically limited in this embodiment of the present application. For example, the location change notification request may be added to an update bearer request (update bearer request) message and sent to the MME.

In FIG. 3, steps S302a to S304a are performed after the policy control session is established between the PGW and the PCRF. Optionally, steps S302a to S304a may alternatively be completed in a process of establishing the policy control session between the PGW and the PCRF. Specifically, the MME sends a create session request (create session request) to the PGW by using the SGW, to trigger establishment of the policy control session between the PGW and the PCRF. During establishment of the policy control session between the PGW and the PCRF, the PCRF sends a PRA subscription request 1 to the PGW, and the PGW determines PRA subscription information 1 based on the PRA subscription request 1 and stores the PRA subscription information 1. After the policy control session is established, the PGW sends a create session response (create session response) to the MME by using the SGW, and the create session response carries a PRA location change notification request 1. This case is not specifically limited in this embodiment of the present application.

Similarly, the OCS may alternatively subscribe with the PGW to a location change event and deliver a PRA location change notification request to the MME in the manner in steps S301a to S304a, as described in steps S301b to S304b.

S301b. Establish an online charging session between the PGW and the OCS.

A process of establishing the online charging session between the PGW and the OCS may be as follows:

The MME sends a create session request (create session request) to the PGW by using the SGW, to trigger establishment of the online charging session between the PGW and the OCS. After the session is established, the PGW sends a create session response (create session response) to the MME. The process belongs to an existing procedure, and therefore details are not described herein in this embodiment of the present application.

S302b. The OCS sends a PRA subscription request 2 to the PGW, so that the PGW receives the PRA subscription request 2, where the PRA subscription request 2 carries an identity of a PRA set 2 and is used to request to subscribe to a location change event of the UE in any PRA in the PRA set 2.

It should be noted that a PRA subscription request sent by the OCS to the PGW is marked as the PRA subscription request 2 herein, so that the PRA subscription request is distinguished from the foregoing PRA subscription request sent by the PCRF to the PGW. This explanation is provided herein and is applicable to all the following embodiments. Details are not described again below.

It should be noted that a PRA set in the OCS is marked as the PRA set 2 herein, so that the PRA set is distinguished from the foregoing PRA set in the PCRF. This explanation is provided herein and is applicable to all the following embodiments. Details are not described again below.

S303b. The PGW determines PRA subscription information 2 based on the PRA subscription request 2 and stores the PRA subscription information 2, where the PRA subscription information 2 includes the identity of the PRA set 2 and an identity of the OCS.

The OCS is a subscription entity that subscribes to the location change event of the UE in any PRA in the PRA set 2.

It should be noted that subscription information corresponding to the OCS is marked as the PRA subscription information 2 herein, so that the subscription information is distinguished from the foregoing subscription information corresponding to the PCRF. This explanation is provided herein and is applicable to all the following embodiments. Details are not described again below.

S304b. The PGW sends a PRA location change notification request 2 to the MME by using the SGW, so that the MME receives the PRA location change notification request 2, where the PRA location change notification request 2 carries the identity of the PRA set 2 and is used to instruct the MME to perform PRA location change reporting when the UE enters or leaves any PRA in the PRA set 2 corresponding to the identity of the PRA set 2.

In other words, a function of the PRA location change notification request 2 is to instruct the MME to report location change information of the UE in the PRA when a location of the UE relative to any PRA in the PRA set 2 changes.

It should be noted that a PRA location change notification request that is sent by the PGW to the MME after the OCS sends the PRA subscription request 2 to the PGW is marked as the PRA location change notification request 2 herein, so that the PRA location change notification request is distinguished from the foregoing PRA location change notification request that is sent by the PGW to the MME after the PCRF sends the PRA subscription request 1 to the PGW. This explanation is provided herein and is applicable to all the following embodiments. Details are not described again below.

A manner in which the PGW sends the PRA location change notification request to the MME is not specifically limited in this embodiment of the present application. For example, the location change notification request may be added to an update bearer request (update bearer request) message and sent to the MME.

In FIG. 3, steps S302b to S304b are performed after the online charging session is established between the PGW and the OCS. Optionally, steps S302b to S304b may alternatively be completed in a process of establishing the online charging session between the PGW and the PCRF. Specifically, the MME sends a create session request (create session request) to the PGW by using the SGW, to trigger establishment of the online charging session between the PGW and the PCRF. During establishment of the online charging session between the PGW and the PCRF, the PCRF sends a PRA subscription request 2 to the PGW, and the PGW determines PRA subscription information 2 based on the PRA subscription request 2 and stores the PRA subscription information 2. After the online charging session is established, the PGW sends a create session response (create session response) to the MME by using the SGW, and the create session response carries a PRA location change notification request 2. This case is not specifically limited in this embodiment of the present application.

It should be noted that there is no necessary performing order between steps S301a to S304a and steps S301b to S304b. Steps S301a to S304a may be performed before steps S301b to S304b are performed. Alternatively, steps S301b to S304b may be performed before steps S301a to S304a are performed. Alternatively, steps S301a to S304a may be performed simultaneously with steps S301b to S304b. This is not specifically limited in this embodiment of the present application. When steps S301a to S304a are performed simultaneously with steps S301b to S304b, the PRA location change notification request 1 in step S304a and the PRA location change notification request 2 in step S304b may be added to a same update bearer request (update bearer request) message and sent to the MME. This is not specifically limited in this embodiment of the present application.

It should be noted that in this embodiment of the present application, to reuse an existing interface as much as possible, an original PRA identity naming manner is reused for the identity of the PRA set. In other words, a naming manner of the identity of the PRA set is the same as the existing PRA identity naming manner. Therefore, in steps S303a and S303b, after the PGW obtains the identity of the PRA set 1 and the identity of the PRA set 2, the PGW cannot identify whether the identities are identities of PRA sets or identities of PRAs, and therefore cannot know whether a location change event of the UE in any PRA in the PRA set or a location change event of the UE in a specific PRA is subscribed to. For the PCRF or the OCS, because the PRA subscription request sent by the PCRF or the OCS to the PGW carries the identity of the PRA set, and in other words, the PCRF or the OCS subscribes to the location change event of the UE in any PRA in the PRA set, the PCRF or the OCS may be considered as a subscription entity that subscribes to the location change event of the UE in any PRA in the PRA set. For example, in step S303a, the PCRF is a subscription entity that subscribes to the location change event of the UE in any PRA in the PRA set 1; and in step S303b, the OCS is a subscription entity that subscribes to the location change event of the UE in any PRA in the PRA set 2. The foregoing explanation is applicable to all the following embodiments. This explanation is provided herein and details are not described again below.

It should be noted that this embodiment of the present application is described by using an example in which both the PCRF and the OCS subscribe with the PGW to a location change event; and certainly, it is possible that only the PCRF subscribes with the PGW to a location change event or only the OCS subscribes with the PGW to a location change event. This is not specifically limited in this embodiment of the present application.

After both the PCRF and the OCS subscribe with the PGW to the location change event, PRA subscription information of the UE that is stored in the PGW may be shown in Table 1.

TABLE 1

| PRA subscription information | Identity of a PRA set | Identity of a subscription entity |
|---|---|---|
| PRA subscription information 1 | Identity of a PRA set 1 | Identity of a PCRF |
| PRA subscription information 2 | Identity of a PRA set 2 | Identity of an OCS |
| ... | ... | ... |

After the MME receives the PRA location change notification request sent by the PGW by using the SGW, the method further includes the following steps S305 to S308.

S305. The MME determines whether PRA location change reporting needs to be performed.

Specifically, when a location of the UE changes, the MME detects whether a location of the UE in a PRA changes. If the location changes, the MME determines that PRA location change reporting needs to be performed. If the location does not change, the MME determines that PRA location change reporting does not need to be performed.

S306. If the MME determines that PRA location change reporting needs to be performed, the MME sends, to the PGW by using the SGW, location change information in a PRA, an identity of the PRA, and an identity of a PRA set to which the PRA corresponding to the identity of the PRA belongs, so that the PGW receives the location change information in the PRA, the identity of the PRA, and the identity of the PRA set to which the PRA corresponding to the identity of the PRA belongs, where the location change information of the UE in the PRA includes information about entering or leaving the PRA by the UE.

Specifically, a correspondence between an identity of a PRA set and identities of all PRAs in the PRA set is preconfigured in the MME. When determining that the location of the UE in the PRA changes, the MME may determine, based on the correspondence, an identity of a PRA set to which the PRA belongs and further send, to the PGW, location change information of the UE in the PRA, an identity of the PRA, and the identity of the PRA set.

For example, if the PRA set 1 includes a PRA 1, a PRA 2, and a PRA 3, and the PRA set 2 includes a PRA 4, a PRA 5, and a PRA 6, a correspondence shown in Table 2 may be configured in the MME.

TABLE 2

| Identity of a PRA set | Identity of a PRA |
|---|---|
| Identity of a PRA set 1 | Identity of a PRA 1 |
|  | Identity of a PRA 2 |
|  | Identity of a PRA 3 |
| Identity of a PRA set 2 | Identity of a PRA 4 |
|  | Identity of a PRA 5 |
|  | Identity of a PRA 6 |
| . . . | . . . |

If a location of the UE in the PRA 2 changes, for example, the UE leaves the PRA 2, the MME may determine, based on the preconfigured correspondence shown in Table 2, that an identity of a PRA set to which the PRA 2 belongs is the identity of the PRA set 1 and further send, to the PGW, location change information of the UE in the PRA 2, the identity of the PRA 2, and the identity of the PRA set 1.

It should be noted that in this embodiment of the present application, a correspondence between an identity of one or more PRA sets and identities of all PRAs in the PRA set(s) is preconfigured not only in the MME but also in the PCRF and the OCS for the PCRF and the OCS to subscribe to a location change event of the UE in any PRA of a specific PRA set. This is not specifically limited in this embodiment of the present application.

In addition, the correspondence between the identity of the PRA set and the identities of all the PRAs in the PRA set is not configured in the PGW. This is also a key factor that causes an existing problem that a session management function entity cannot decide how to report a location change event in a PRA to a subscription entity because the location change event in the PRA that is reported by a mobility management entity carries only an ID(s) of the PRA when an ID of the PRA set is used to subscribe to the location change event in the PRA in a multi-PRA scenario.

S307. The PGW determines, based on the identity of the PRA set that is sent by the MME and the stored PRA subscription information, a subscription entity that subscribes to a location change event of the UE in any PRA in the PRA set.

As described in step S303a or step S303b, the PRA subscription information includes the identity of the PRA set and an identity of the subscription entity that subscribes to the location change event of the UE in any PRA in the PRA set.

In the example of step S306, if the location of the UE in the PRA 2 changes, after receiving the location change information of the UE in the PRA 2, the identity of the PRA 2, and the identity of the PRA set 1, the PGW may determine, based on the identity of the PRA set 1 and the stored subscription information shown in Table 1, that a subscription entity that subscribes to a location change event of the UE in any PRA in the PRA set 1 is the PCRF.

S308. The PGW sends, to the subscription entity determined in step S307, the identity of the PRA and the location change information of the UE in the PRA that are sent by the MME, so that the subscription entity receives the identity of the PRA and the location change information of the UE in the PRA.

For example, in the example of step S307, the PGW sends, to the PCRF, the identity of the PRA 2 and the location change information of the UE in the PRA 2, so that the PCRF receives the identity of the PRA 2 and the location change information of the UE in the PRA 2, as shown in FIG. 3. Further, the PCRF may send new policy information to the PGW, and the PGW sends location change acknowledgement information to the MME by using the SGW. This is not described in detail in this embodiment of the present application. For details, refer to an existing procedure.

It should be noted that FIG. 3 is merely illustrated by using an example in which the determined subscription entity that subscribes to the location change event of the UE in any PRA in the PRA set is the PCRF. Certainly, the determined subscription entity that subscribes to the location change event of the UE in any PRA in the PRA set may alternatively be the OCS, and then, the identity of the PRA and the location change information of the UE in the PRA are sent to the OCS. This is not specifically limited in this embodiment of the present application.

It should be noted that for simplicity, steps S305 to S308 and related examples are described by using an example in which the MME reports a location change event in one PRA. Certainly, the MME may alternatively report location change events in a plurality of PRAs. For example, in the foregoing example, if the UE leaves the PRA 2 and enters the PRA 4, the MME may report location change events in the two PRAs. Related information of a location change event in one PRA includes location change information in the PRA that indicates that the UE leaves the PRA 2, the identity of the PRA 2, and the identity of the PRA set 1. Related information of a location change event in another PRA includes location change information in the PRA that indicates that the UE enters the PRA 4, the identity of the PRA 4, and the identity of the PRA set 2. A quantity of PRAs in which location change events are reported by the MME is not specifically limited in this embodiment of the present application. When the MME reports location change events in a plurality of PRAs, for a processing procedure of a location change event of any PRA, refer to steps S305 to S308. Details are not described herein again in this embodiment of the present application.

In conclusion, based on the location change reporting method provided in this embodiment of the present application, the mobility management entity sends, to the session management function entity, the location change information in the PRA, the identity of the PRA, the identity of the PRA set to which the PRA corresponding to the identity of the PRA belongs, so that the session management function entity can determine, based on the identity of the PRA set, the subscription entity that subscribes to the location change event of the UE in any PRA in the PRA set, and further can send the identity of the PRA and the location change information of the UE in the PRA to the subscription entity. This can resolve an existing problem that a session management function entity cannot decide how to report a location change event of UE in a PRA to a subscription entity because the location change event of the UE in the PRA that is reported by a mobility management entity carries only an ID(s) of the PRA when an ID of the PRA set is used to subscribe to the location change event of the UE in the PRA in a multi-PRA scenario.

Actions of the PGW in steps S301a, S303a, S304a, S301b, S303b, S304b, S307, and S308 may be performed by the processor 201 in the computer device 200 shown in FIG. 2 by invoking the application program code stored in the memory 203. This is not limited in this embodiment of the present application.

It should be noted that the embodiment shown in FIG. 3 is described by using an example in which the PGW and the SGW are deployed on different devices. Certainly, the PGW and the SGW may alternatively be integrated, and in other words, the PGW and the SGW are deployed on a same device. This case is not specifically limited in this embodiment of the present application.

The foregoing mainly describes the solutions provided in the embodiments of the present application from a perspective of interaction between network elements. It can be understood that, to implement the foregoing functions, the foregoing session management function entity includes corresponding hardware structures and/or software modules for performing the functions. A person of ordinary skill in the art should be easily aware that units and algorithm steps in the examples described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

In the embodiments of the present application, the session management function entity may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present application is an example, and is merely logical function division. There may be another division manner in an actual implementation.

Figure 4:
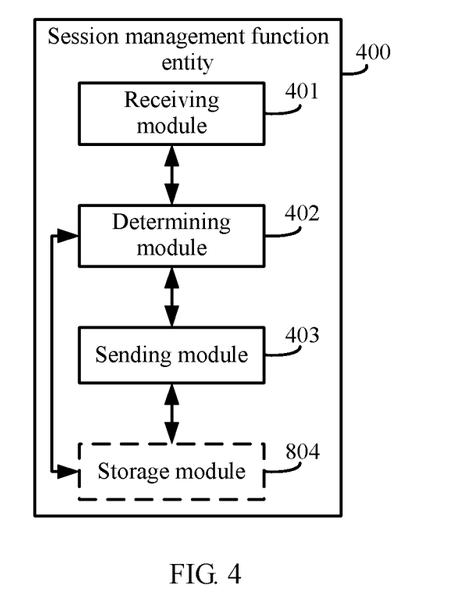
FIG. 4 is a schematic structural diagram of a session management function entity according to an embodiment of the present application.

For example, when each function module is obtained through division based on each corresponding function, FIG. 4 is a possible schematic structural diagram of the session management function entity in the foregoing embodiment. The session management function entity 400 includes a receiving module 401, a determining module 402, and a sending module 403.

The receiving module 401 is configured to receive location change information of UE in a PRA, an identity of the PRA, and an identity of a PRA set to which the PRA corresponding to the identity of the PRA belongs that are sent by a mobility management entity, where the location change information of the UE in the PRA includes information about entering or leaving the PRA by the UE.

The determining module 402 is configured to determine, based on the identity of the PRA set and stored PRA subscription information, a subscription entity that subscribes to a location change event of the UE in any PRA in the PRA set, where the PRA subscription information includes the identity of the PRA set and an identity of the subscription entity that subscribes to the location change event of the UE in any PRA in the PRA set.

The sending module 403 is configured to send the identity of the PRA and the location change information of the UE in the PRA to the subscription entity.

Further, as shown in FIG. 4, the session management function entity further includes a storage module 404.

The receiving module 401 is further configured to receive a PRA subscription request sent by the subscription entity, where the PRA subscription request carries the identity of the PRA set and is used to request to subscribe to a location change event of the UE in any PRA in the PRA set corresponding to the identity of the PRA set.

The determining module is further configured to determine the PRA subscription information based on the PRA subscription request.

The storage module 404 is configured to store the PRA subscription information.

The sending module 403 is configured to send a PRA location change notification request to the mobility management entity, where the PRA location change notification request carries the identity of the PRA set and is used to instruct the mobility management entity to perform PRA location change reporting when the UE enters or leaves any PRA in the PRA set corresponding to the identity of the PRA set.

Optionally, the subscription entity may include a PCRF entity or an OCS entity.

Optionally, the mobility management entity may include an MME, an SGSN, or an MMF.

Optionally, the session management function entity may include a PGW or an SMF.

All related content of the steps in the foregoing method embodiment may be cited in function descriptions of corresponding function modules. Details are not described herein again.

Figure 5:
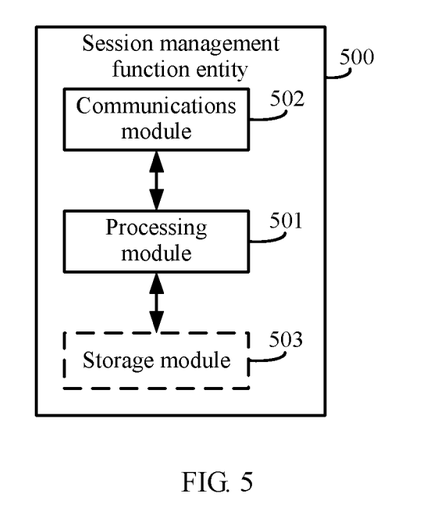
FIG. 5 is a schematic structural diagram of another session management function entity according to an embodiment of the present application.

When each function module is obtained through integration, FIG. 5 is a possible schematic structural diagram of the session management function entity in the foregoing embodiment. The session management function entity 500 includes a processing module 501, a communications module 502, and a storage module 503. The processing module 501 may be configured to perform an operation that can be performed by the determining module 402 in FIG. 4. The communications module 502 may be configured to perform operations that can be performed by the receiving module 401 and the sending module 403 in FIG. 4. The storage module 503 may be configured to perform an operation that can be performed by the storage module 404 in FIG. 4. For details, refer to the embodiment shown in FIG. 4. Details are not described herein again in this embodiment of the present application.

All related content of the steps in the foregoing method embodiment may be cited in function descriptions of corresponding function modules. Details are not described herein again.

In this embodiment, the session management function entity is presented by obtaining each function module through division based on each corresponding function, or the session management function entity is presented by obtaining each function module through division in an integrated manner. The "module" herein may be an application-specific integrated circuit (ASIC), a circuit, a processor and a memory that execute one or more software or firmware programs, an integrated logic circuit, and/or another component that can provide the foregoing functions. In a simple embodiment, a person skilled in the art may figure out that the form shown in FIG. 2 may be used for the session management function entity 400 or the session management function entity 500. For example, the receiving module 401, the determining module 402, the sending module 403, and the storage module 404 in FIG. 4 may be implemented by the processor 201 and the memory 203 in FIG. 2. Specifically, the receiving module 401, the determining module 402, the sending module 403, and the storage module 404 may be implemented by invoking, by the processor 201, the application program code stored in the memory 203. This is not limited in this embodiment of the present application. Alternatively, for example, the processing module 501, the communications module 502, and the storage module 503 in FIG. 5 may be implemented by the processor 201 and the memory 203 in FIG. 2. Specifically, the processing module 501, the communications module 502, and the storage module 503 may be implemented by invoking, by the processor 201, the application program code stored in the memory 203. This is not limited in this embodiment of the present application.

An embodiment of the present application further provides a computer storage medium. The computer storage medium is configured to store a computer software instruction used by the foregoing session management function entity. The computer software instruction includes a program designed for executing the method embodiment. Location change reporting can be implemented by executing the stored program.

Although the present application is described with reference to the embodiments, in a process of implementing the present application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of plurality. A single processor or another unit may implement several functions enumerated in the claims. Some measures are described in dependent claims that are different from each other, but this does not indicate that these measures cannot be combined to produce a good effect.

A person skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a magnetic disk memory, a CD-ROM, an optical memory, and the like) that include computer-usable program code. The computer program is stored/distributed in a proper medium and is provided as or used as a part of hardware together with other hardware, or may be distributed in another form, such as in the Internet or in another wired or wireless telecommunications system.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although the present application is described with reference to specific features and the embodiments thereof, apparently, various modifications and combinations may be made to them without departing from the spirit and scope of the present application. Correspondingly, the specification and accompanying drawings are merely example descriptions of the present application defined by the appended claims, and are considered as covering any of or all modifications, variations, combinations or equivalents within the scope of the present application. Apparently, a person skilled in the art can make various modifications and variations to the present application without departing from the spirit and scope of the present application. The present application is intended to cover these modifications and variations of the present application provided that these modifications and variations fall within the scope of protection defined by the claims of the present application and equivalent technologies thereof.

What is claimed is:

1. A method for reporting location changes of user equipment (UE), comprising:
   sending, by a mobility management entity to a session management function entity, location change information of the UE in a first presence reporting area (PRA), an identifier of the first PRA, and an identifier of a first PRA set comprising multiple PRAs including the first PRA, wherein the location change information of the UE in the first PRA comprises information regarding the UE entering or leaving the first PRA;
   receiving, by the session management function entity, the location change information, the identifier of the first PRA and the identifier of the first PRA set, wherein the session management function entity has stored thereon subscription information comprising a correspondence between the identifier of the first PRA set and an identifier of a first subscription entity; and sending, by the session management function entity, the identifier of the first PRA and the location change information of the UE in the first PRA to the first subscription entity according to the subscription information.

2. The method according to claim 1, further comprising:
receiving, by the session management function entity from the first subscription entity, a PRA subscription request, wherein the PRA subscription request carries the identifier of the first PRA set and requests to subscribe to location change events of the UE in the PRAs in the first PRA set; and sending, by the session management function entity to the mobility management entity, a PRA location change notification request carrying the identifier of the first PRA set to instruct the mobility management entity to perform PRA location change reporting when the UE enters or leaves a PRA in the first PRA set.

3. The method according to claim 1, further comprising:
storing, by the session management function entity, the subscription information in a local storage of the session management function entity.

4. The method according to claim 1, further comprising:
determining, by the mobility management entity upon determining that a location of the UE in the first PRA has changed, the identifier of the first PRA set based on preconfigured correspondence between the identity of the first PRA set and identities of the multiple PRAs in the first PRA set.

5. A system for reporting location changes of user equipment (UE), comprising:
a mobility management entity; and
a session management function entity,
wherein the mobility management entity is configured to:
send, to the session management function entity, location change information of the UE in a first presence reporting area (PRA), an identifier of the first PRA, and an identifier of a first PRA set comprising multiple PRAs including the first PRA, wherein the location change information of the UE in the first PRA comprises information regarding the UE entering or leaving the first PRA;
wherein the session management function entity is configured to:
receive the location change information, the identifier of the first PRA and the identifier of the first PRA set, wherein the session management function entity has stored thereon subscription information comprising a correspondence between the identifier of the first PRA set and an identifier of a first subscription entity; and send the identifier of the first PRA and the location change information of the UE in the first PRA to the first subscription entity according to the subscription information.

6. The system according to claim 5, wherein the session management function entity is further configured to:
receive, from the first subscription entity, a PRA subscription request, wherein the PRA subscription request carries the identifier of the first PRA set and requests to subscribe to location change events of the UE in the PRAs in the first PRA set; and send, to the mobility management entity, a PRA location change notification request carrying the identifier of the first PRA set to instruct the mobility management entity to perform PRA location change reporting when the UE enters or leaves a PRA in the first PRA set.

7. The system according to claim 5, wherein the session management function entity is further configured to:
store the subscription information in a local storage of the session management function entity.

8. The system according to claim 5, wherein the mobility management entity is further configured to:
determine, upon determining that a location of the UE in the first PRA has changed, the identifier of the first PRA set based on preconfigured correspondence between the identity of the first PRA set and identities of the multiple PRAs in the first PRA set.

9. A session management function entity comprising:
a memory storing computer-executable instructions;
a processor configured to execute the computer-executable instructions to:
receive, from a mobility management entity, location change information of user equipment (UE) in a first presence reporting area (PRA), an identifier of the first PRA, and an identifier of a first PRA set comprising multiple PRAs including the first PRA, wherein the location change information of the UE in the first PRA comprises information regarding the UE entering or leaving the first PRA, wherein the session management function entity has stored thereon subscription information comprising a correspondence between the identifier of the first PRA set and an identifier of a first subscription entity; and
send the identifier of the first PRA and the location change information of the UE in the first PRA to the first subscription entity according to the subscription information.

10. The session management function entity according to claim 9, wherein the processor is configured to further execute the computer-executable instructions to:
receive, from the first subscription entity, a PRA subscription request, wherein the PRA subscription request comprises the identifier of the first PRA set and requests to subscribe to location change events of the UE in the PRAs in the first PRA set; and send, to the mobility management entity, a PRA location change notification request comprising the identifier of the first PRA set to indicate the mobility management entity to perform PRA location change reporting when the UE enters or leaves a PRA in the first PRA set.

11. The session management function entity according to claim 9, wherein the processor is configured to further execute the computer-executable instructions to:
store the subscription information in a local storage of the session management function entity.

12. The session management function entity according to claim 9, wherein the processor is configured to further execute the computer-executable instructions to:
determine, upon determining that a location of the UE in the first PRA has changed, the identifier of the first PRA set based on preconfigured correspondence between the identity of the first PRA set and identities of the multiple PRAs in the first PRA set.

* * * * *